United States Patent [19]
Fetescu

[11] Patent Number: 5,799,481
[45] Date of Patent: Sep. 1, 1998

[54] METHOD OF OPERATING A GAS-TURBINE GROUP COMBINED WITH A WASTE-HEAT STEAM GENERATOR AND A STEAM CONSUMER

[75] Inventor: Mircea Fetescu, Ennetbaden, Switzerland

[73] Assignee: Asea Brown Boveri AG, Baden, Switzerland

[21] Appl. No.: 761,390

[22] Filed: Dec. 6, 1996

[30] Foreign Application Priority Data

Dec. 7, 1995 [DE] Germany ............... 195 45 668.8

[51] Int. Cl.$^6$ ..................................... F02C 6/18
[52] U.S. Cl. ............... 60/39.02; 60/39.07; 60/39.182
[58] Field of Search ............... 60/39.02, 39.07, 60/39.182, 39.33; 237/12.1

[56] References Cited

U.S. PATENT DOCUMENTS

| | | | |
|---|---|---|---|
| 2,717,491 | 9/1955 | Barr | 60/39.07 |
| 4,827,711 | 5/1989 | Isaksson | 60/39.07 |
| 4,920,276 | 4/1990 | Tateishi et al. | 237/12.1 |

FOREIGN PATENT DOCUMENTS

| | | |
|---|---|---|
| 2512774C2 | 9/1982 | Germany. |
| 3225140A1 | 1/1984 | Germany. |
| 3447879A1 | 8/1985 | Germany. |
| 3841224A1 | 6/1990 | Germany. |
| 273936 | 11/1989 | Japan ............... 237/12.1 |

OTHER PUBLICATIONS

"Das kombinierte Gas–/Dampfturbinen–Heizkraftwerk Utrecht", H.R. Gubser, Brown Boveri Mitt. Oct. 1978, pp. 687–690.

*Primary Examiner*—Louis J. Casaregola
*Attorney, Agent, or Firm*—Burns, Doane, Swecker & Mathis, L.L.P.

[57] ABSTRACT

A method of operating a gas-turbine group, combined with a downstream waste-heat steam generator and a steam consumer, in particular a steam turbine, for heat/power cogeneration. The object of the invention is to provide a method which utilizes the utilizable heat energy in the waste-heat steam generator of such a combined-cycle plant at a lower cost and reduces the output fluctuations when demand varies at the external heat consumer. According to the invention, this is achieved in that first of all a quantity of feedwater increased by the maximum heating-water quantity required is directed into the waste-heat steam generator (2). After the feedwater is heated, the additional quantity is diverted as heating water from the water/steam cycle. The diverted heating water is then supplied to the external consumer (30) and the residual heat is used to heat the feedwater tank (3). If there is low demand or no demand for heating water at the external consumer (30), the released quantity of additional feedwater is used to generate steam.

7 Claims, 3 Drawing Sheets

METHOD OF OPERATING A GAS-TURBINE GROUP COMBINED WITH A WASTE-HEAT STEAM GENERATOR AND A STEAM CONSUMER

BACKGROUND OF THE INVENTION

1. Field of the Invention

The invention relates to a method of operating gas-turbine group, combined with a downstream waste-heat steam generator and a steam consumer, for heat/power cogeneration.

2. Discussion of Background

In such combined-cycle plants for heat/power cogeneration, the thermal energy must always be provided in the form required at the particular moment, i.e. as thermal output for electric power generation in the generator and as heating fluid or process heat for the external heat consumers. Therefore both the energy demand for the generation of electric power and that for the external heat consumers fluctuate between a minimum and a maximum value. The use of auxiliary firing or the use of a dual-pressure or multi-pressure waste-heat steam generator is known in order to adapt to the demand.

In contrast to the solutions mentioned, DE-C2-25 12 774 discloses a combined-cycle plant having a single-pressure waste-heat steam generator without auxiliary firing. In this plant, heating water for an external heat consumer is provided from the waste-heat steam generator. To this end, a heating-water heater separate from the actual water/steam cycle and connected to a separate water feed line is arranged in the waste-heat steam generator. In this way, some of the flue-gas energy still present downstream of the economizer, which flue-gas energy would otherwise be discharged via the stack, is utilized for heating the heating water.

However, this takes place only if there is a high demand for heating water at the external consumers. To adapt to a decreasing demand for heat, the heating water is partly or completely directed past the waste-heat steam generator, for which purpose a successively opening branch connection is formed in the water feed line. Thus a considerable portion of utilizable heat energy is given off to the environment.

Since the steam turbine of the combined-cycle plant is designed as a back-pressure turbine, some of the steam is constantly condensed, i.e. it is not utilized for electric power generation, during operation of the steam turbine. If there is a high demand for heat at the external consumer, the resulting heat of condensation is used to heat the additional heating water. However, condensation is effected constantly, i.e. even if the demand at the heat consumer decreases or completely falls away. In order to absorb the heat of condensation in this situation too, an additional heat interchanger/cooler via which the recovered energy is given off to the environment has to be arranged in the cycle. The combined-cycle plant therefore has not only low operating flexibility but also low efficiency.

In order to prevent such energy losses, the heating coil additionally arranged in the waste-heat steam generator in a known combined-cycle power station (Brown Boveri Mitteilungen Oct. 10, 1978, pages 687-690) opens out in a closed water cycle. There, the heat energy of the heated water is transferred by means of a preheater to the feedwater of the waste-heat steam generator and by means of a heat exchanger to the heating water of the external heat consumer. Thus, internal utilization of the utilizable heat energy of the flue gas can be effected even when there is decreasing external demand for heat.

However, only minor heat transfer or no heat transfer takes place in the abovementioned heat exchanger if there is low demand or no demand for heat at the external consumer, so that the closed water cycle continues to heat up. The increased water temperature leads to a lower temperature difference in the additional heating coil of the water/steam cycle, i.e. to a reduced recovery of energy and therefore to a lower output of the system. Furthermore, the flue outlet temperature is increased. In addition, energy is continually required both for the closed water cycle and the heating-water cycle leading to the external consumer in order to maintain the circulation of the water on the one hand and the pressure in the piping on the other hand. It has to be concluded from this -that the output of the system is lowest if there is no demand for heat at the external consumer.

Both solutions, described in more detail, of the prior art require a multiplicity of additional components, such as heat exchangers, pumps, valves, piping and control elements. In addition, the complexity of the systems leads to complicated operation which is susceptible to trouble. A disadvantage common to both solutions is therefore the relatively high material costs and the complexity of the method.

SUMMARY OF THE INVENTION

Accordingly, one object of the invention, in attempting to avoid all these disadvantages, is to provide a novel method which utilizes the utilizable heat energy in the waste-heat steam generator of a combined-cycle plant for heat/power cogeneration at a lower cost and reduces the output fluctuations when there is varying demand at the external heat consumer.

According to the invention, this is achieved in a method in which first of all a quantity of feedwater increased by the maximum heating-water quantity required for the external utilization is directed into the low temperature region of the waste-heat steam generator. The actual demand for heating water for the external utilization is then determined. If there is a high to maximum demand for heating water, the additional quantity of feedwater is diverted as heating water from the water/steam cycle after the heating. The diverted heating water is then supplied for the external utilization and its residual heat is used to heat the feedwater tank. On the other hand, if there is only a small demand for hot water or if there is no demand at all, the additional quantity of feedwater remains in the water/steam cycle and is used there for additional generation of steam.

With this method, the demand at the external heat consumer can always be met by diverting a corresponding quantity of heating water. If the external demand for heat decreases, the released quantity of additional feedwater is utilized to generate steam by both the terminal temperature difference and that of the approach temperature being reduced. In this case, automatic, flexible adaptation to the external demand for heat, i.e. during the utilization of the additional feedwater, is achieved. On account of this, monitoring and control functions can be dispensed with so that the complexity of the method is reduced.

The recovery of heat from the flue gases of the gas-turbine group is increased by feeding an increased quantity of feedwater into the waste-heat steam generator provided with a correspondingly large heat-exchanger surface. Thus, the utilization of the heat energy of the flue gas increases, and not only does the energy loss to the environment advantageously decrease but so too does the stack temperature. Since the heating-water line is connected via the feedwater tank directly to the waste-heat steam generator, the heating water is also drawn off if the demand at the external heat consumer ceases. Accordingly, there is no closed heating-water cycle, so that there is no risk of overheating of the heating-water line.

It is especially expedient if the diverted heating water is first of all brought into heat exchange with a heat transfer medium of the external consumer and is then passed on to the feedwater tank. Consequently, the demand for heat at the external consumer can first of all be satisfied and the residual heat still present can then be utilized internally.

The demand for heat at the external consumer is determined by constant temperature measurement of the heating water after its heat exchange with the heat transfer medium of the external consumer. The temperature difference, determined in the process, from the previous measurement is used as a basis for a corresponding control of the heating-water quantity to be diverted from the water/steam cycle. In this way, an especially simple distribution of the available heating water, i.e. of the recoverable heat energy, is achieved.

In a second embodiment of the invention, the residual quantity of the additional feedwater is further heated after a quantity of heating water corresponding to the current demand for heat at the external heat consumer is diverted from the water/steam cycle. The residual quantity of the additional feedwater is then likewise diverted from the water/steam cycle and split up into two portions. The first portion is used to generate steam and the second portion is recirculated to the feedwater tank. The heating-water quantity which cannot be utilized for the external consumer when demand for heat at the latter is decreasing, can thus be utilized not only for generating steam, but also directly for heating the feedwater in the feedwater tank. Since the feedwater is already preheated in this way, only an appropriately reduced steam quantity needs to be diverted from the steam consumer for this purpose. As a result of this, the available steam quantity increases, which is equivalent to a higher output of the steam consumer.

In a next embodiment of the invention, the heating-water quantity not required for the external consumer but already diverted from the water/steam cycle is diverted again upstream of the heat exchange and fed directly to the feedwater tank. This results in shorter line paths, which reduces the energy losses. In addition, components such as, for example, piping, reducing valves, monitoring elements, etc. are dispensed with, so that not only the material costs but also the total cost of construction decrease.

In a further embodiment of the invention, the feedwater is first of all passed at low pressure into the water/steam cycle. The heated feedwater is likewise passed out of the waste-heat steam generator after the heating water is diverted, is then pumped in again at high pressure and is heated further before its evaporation. In this case, only the water quantity required for the generation of steam is acted upon by high pressure, as a result of which the drive energy used for pumping can also be used in an optimum manner. In addition, pressure-decrease losses in the heating-water line are avoided. Finally, fewer components are required, so that the plant can be erected more cost effectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings of a gas turbine/steam turbine combined-cycle plant with single-pressure waste-heat steam generator and without auxiliary firing, wherein.

DESCRIPTION OF THE PREFERRED EMBODIMENTS

Figure 1:
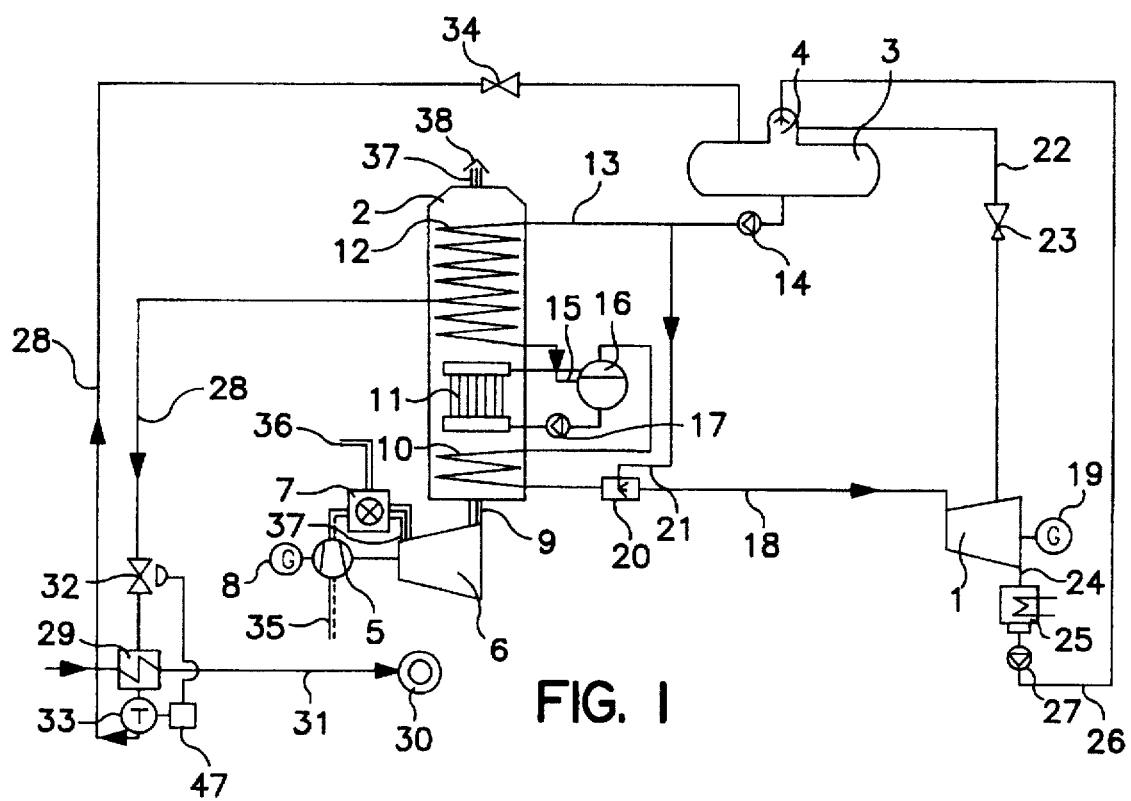
FIG. 1 shows a flow scheme of the combined-cycle plant.

Referring now to the drawings, wherein like reference numerals designate identical or corresponding parts throughout the several views, only the elements essential for understanding the invention are shown and the direction of flow of the working media is designated by arrows, the gas-turbine/steam-turbine combined-cycle plant includes a gas-turbine group, a steam consumer 1 designed as a condensing steam turbine, a waste-heat steam generator 2 arranged between the two, and a feedwater tank 3 with integrated feedwater preheater/deaerator 4. The gas-turbine group is composed of a compressor 5, a gas turbine 6 coupled to it, a combustion chamber 7 and a generator 8. Instead of the condensing steam turbine 1, other steam turbines or steam consumers 1 may of course also be used.

A superheater 10, an evaporator 11 and an economizer 12 are arranged one after the other in the waste-heat steam generator 2 connected to the gas turbine 6 via a flue-gas duct 9. The economizer 12 is connected to the feedwater tank 3 on the inlet side via a feedwater feed line 13. A feedwater pump 14 is arranged in the feedwater feed line 13. On the outlet side, the economizer 12 is connected to a steam drum 16 via a water line 15. The evaporator 11 and the superheater 10 are connected to the steam drum 16, a circulating pump 17 being arranged between steam drum 16 and evaporator 11. A live-steam line 18 connects the superheater 10 to the condensing steam turbine 1, on the shaft of which a second generator 19 is arranged.

A live-steam cooler 20 is formed in the live-steam line 18 and is connected to the feedwater feed line 13 via a line 21. The feedwater preheater/deaerator 4 is coupled to the condensing steam turbine 1 via a bleed line 22. A control/pressure-reducing valve 23 is arranged in the bleed line 22. The condensing steam turbine 1 is connected to the condenser 25 via an exhaust-steam line 24. The feedwater preheater/deaerator 4 is connected to the condenser 25 by means of a water line 26 in which a condensate pump 27 is arranged.

A heating-water line 28, which ends in the feedwater tank 3, branches off from the economizer 12, designed with an enlarged heat-exchange surface. Formed in the heating-water line 28 is a preheater 29 which interacts with a heating-water line 31 leading to an external consumer 30. A district-heating network, for example, is connected as external consumer 30 to the heating-water line 31. Further preheaters (not shown) fed from the live-steam line 18 or the condensing steam turbine 1 may be arranged in the heating-water line 31. In the heating-water line 28, a control valve 32 is arranged upstream of the preheater 29 and a temperature measuring point 33 is arranged downstream of the preheater 29. They are both connected to one another via an analyzing and control unit 47. The heating-water line 28 contains a pressure-reducing valve 34 arranged between the preheater 29 and the feedwater tank 3.

During operation of the combined-cycle plant, the compressor 5 draws in ambient air 35, compresses it and passes it into the combustion chamber 7. Fuel 36 is fed there and mixed with the compressed ambient air 35, and the fuel/air mixture formed therefrom is burned. The flue gases 37 resulting during the combustion are directed into the gas turbine 6 and expanded in it. In the process, the compressor 5 and the generator 8 arranged on one shaft with the gas turbine 6 are driven simultaneously, the generator 8 for the purpose of electric power generation.

The expanded, still hot flue gases 37 are directed into the waste-heat steam generator 2 and are utilized there to generate steam for the condensing steam turbine 1. To this end, heat energy is extracted from the flue gases 37 by heat exchange with water passed in counterflow through the waste-heat steam generator 2 and originating from the feedwater tank 3. The flue gases 37 are then discharged to the environment via a stack 38. The resulting superheated steam is fed to the condensing steam turbine 1 via the live-steam line 18, the temperature of the steam being controlled by injection of water in the live-steam cooler 20. The superheated steam is expanded in the condensing steam turbine 1 so that the generator 19 connected to it is driven for the purpose of electric power generation.

The steam issuing from the condensing steam turbine 1 via the exhaust-steam line 24 is condensed in the condenser 25. The resulting condensate is delivered from there to the feedwater tank 3 by means of the condensate pump 27 arranged in the water line 26. Via the bleed line 22 of the condensing steam turbine 1, superheated steam is directed to the feedwater preheater/deaearator 4, i.e. likewise to the feedwater tank 3. The bled steam serves to heat the feedwater tank 3. The feedwater held in intermediate storage in the feedwater tank 3 is constantly pumped into the waste-heat steam generator 2 by the feedwater pump 14.

The feedwater first of all passes into the economizer 12, where it is preheated and passed on to the steam drum 16. The feedwater is now directed by means of the circulating pump 17 into the evaporator 11 and is evaporated there. The resulting steam is again directed through the steam drum 16 and, after separation of the gaseous from the liquid phase, into the superheater 10. The steam is superheated in the superheater 10 and is then fed to the condensing steam turbine 1 via the live-steam line 18. The cycle is thus closed.

The method described up to this point relates to a combined-cycle plant intended solely for electric power generation. However, an external heat consumer 30 is to be additionally supplied here with process steam or process heat from the waste-heat steam generator 2. To this end, a quantity of water which exceeds the flow rate of feedwater required for the generation of steam is directed into the waste-heat steam generator 2. First of all, therefore, a quantity of feedwater increased by the maximum heating-water quantity is pumped out of the feedwater tank 3 into the waste-heat steam generator 2, the economizer 12 of which is provided with a correspondingly enlarged heat-exchanger surface. After the feedwater is heated in the economizer 12, the additional quantity is diverted as heating water from the water/steam cycle into the heating-water line 28.

To this end, the temperature of the heating water is constantly monitored at the temperature measuring point 33, i.e. downstream of the preheater 29. If there is a change in demand at the external consumer 30, the analyzing and control unit 47 connected to the temperature measuring point 33 determines a temperature difference, which serves as a basis for a corresponding adjustment of the control valve 32. In this way, precisely the heating-water quantity required by the external consumer 30 is diverted from the economizer 12. This heating water is then directed through the preheater 29, in the course of which most of its heat energy is transferred to the heat-transfer medium, flowing through the heating-water line 31, of the external consumer 30. The residual heat remaining in the heating water is discharged via the heating-water line 28 and serves to heat the feedwater tank 3.

If the temperature measurement reveals a lower demand than the maximum demand at the external consumer 30, the control valve 32 is correspondingly closed and thus a reduced quantity of heating water is diverted via the heating-water line 28. The quantity of additional feedwater not required by the external consumer 30, i.e. the released quantity, is utilized in the waste-heat steam generator 2 to generate steam.

Figure 2:
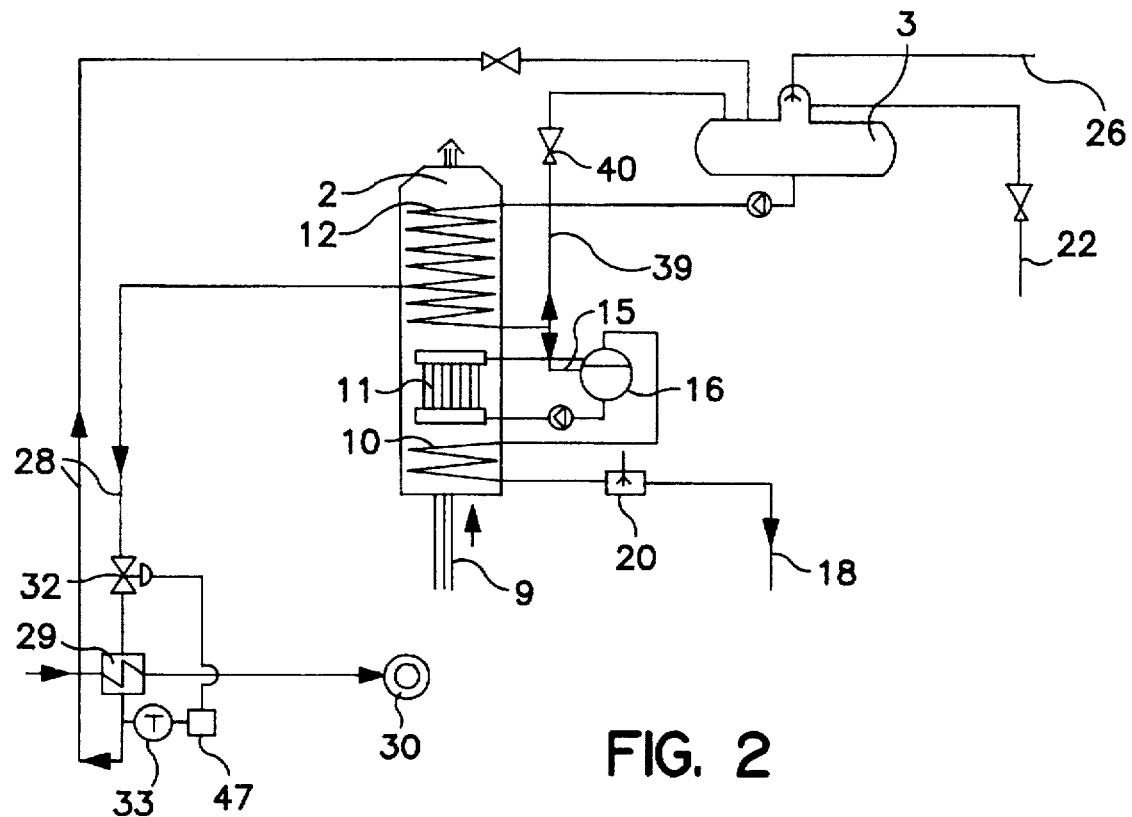
FIG. 2 shows a detail from FIG. 1, in the region of the waste-heat steam generator, in a second embodiment.

A second exemplary embodiment differs from the first only in that a line 39, which ends at the feedwater tank 3 and contains a control/pressure-reducing valve 40, branches off from the water line 15 (FIG. 2).

Here, if the analyzing and control unit determines a lower demand than the maximum demand at the external consumer 30, the residual quantity of additional feedwater is heated further after the diverting of the heating water and is then likewise diverted from the water/steam cycle. After that, however, this residual quantity is split up into two portions. One portion, together with the actual feedwater, is used to generate steam and the other portion is recirculated via the line 39 to the feedwater tank 3. Thus, the additional water quantity which cannot be utilized for the external consumer 30 when demand for heat at the latter decreases, is utilized not only for generating steam, but also for preheating the feedwater in the feedwater tank 3. In this way, less steam has to be drawn off via the bleed line 22 for heating the feedwater tank 3, so that the output of the condensing steam turbine 1 and thus the electric power generation of the generator 19 increase.

Figure 3:
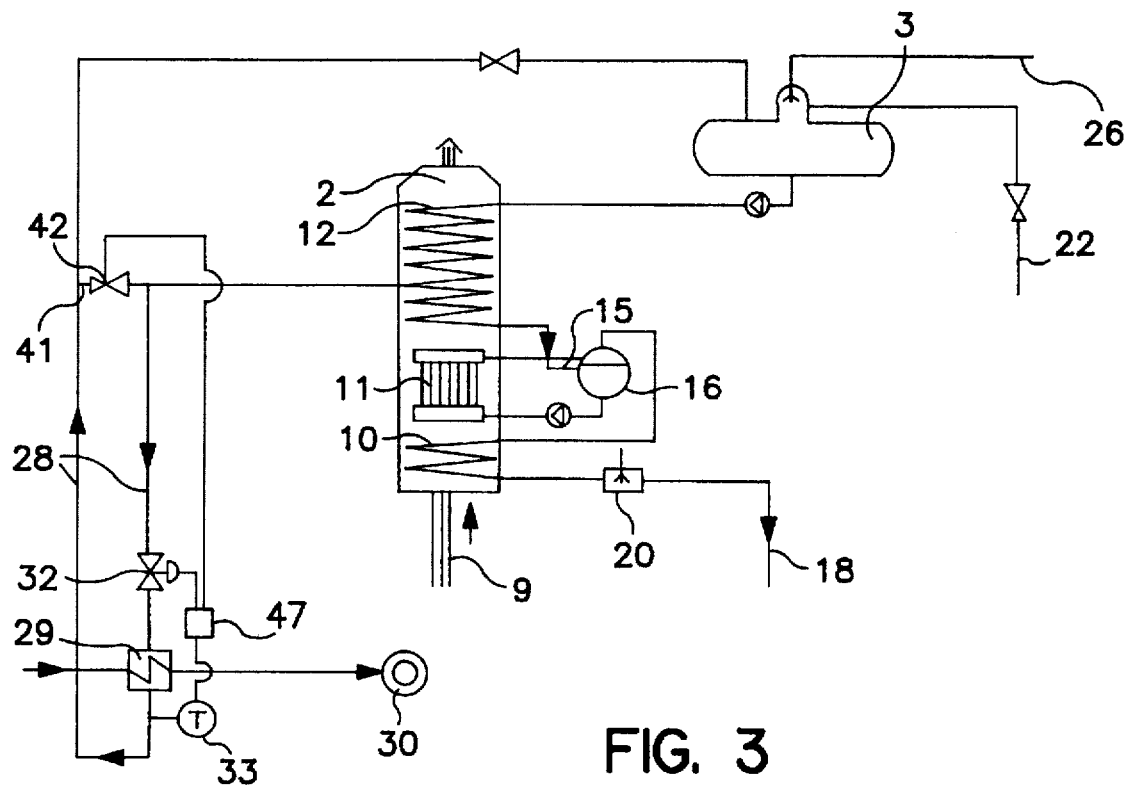
FIG. 3 shows a representation according to FIG. 2 but in a third embodiment.

In a third exemplary embodiment, a bypass line 41 bridging the preheater 29 is arranged in the heating-water line 28 and a control valve 42 is in turn arranged in the bypass line 41 (FIG. 3). The control valve 42 is connected to the aforesaid analyzing and control unit 47 and is opened or closed to a greater or lesser degree in accordance with the demand for heat at the external consumer 30. Thus, the heating-water quantity not required for the external consumer 30 but already diverted from the water/steam cycle is fed directly to the feedwater tank 3. A line 39 which branches off from the water line 15 leading out of the economizer 12 and ends in the feedwater tank 3 is not required in this exemplary embodiment.

Figure 4:
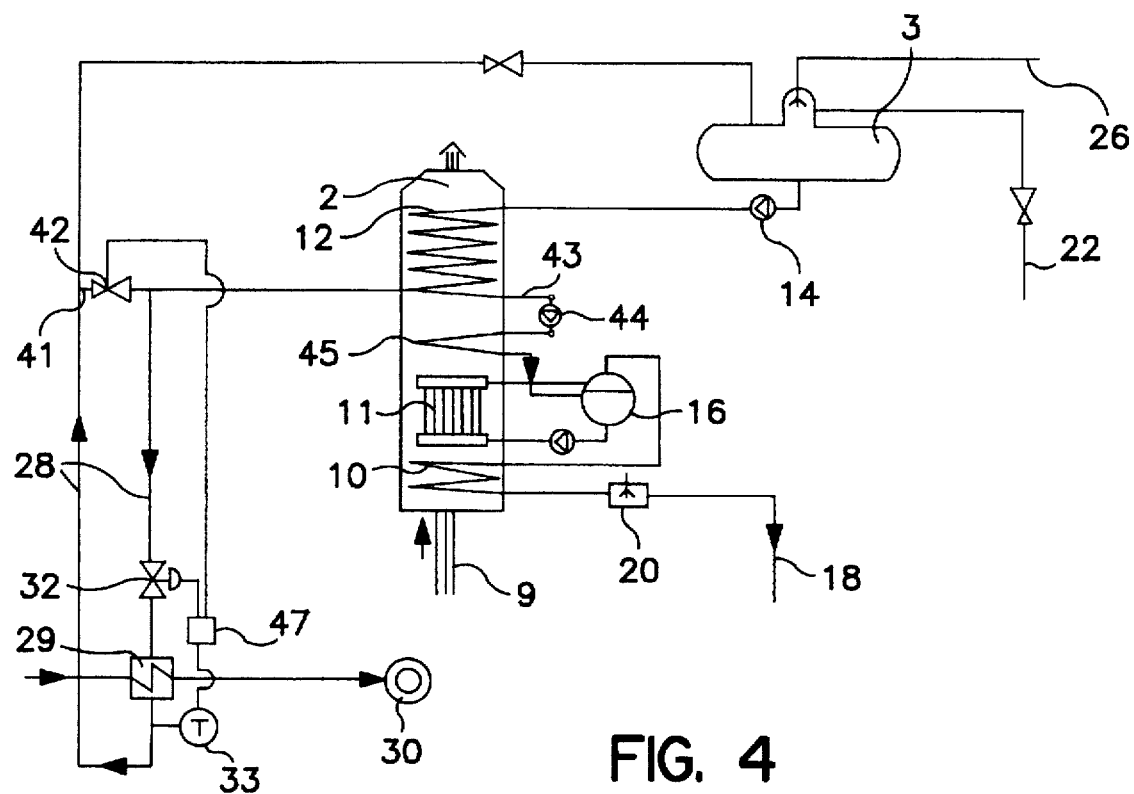
FIG. 4 shows a representation according to FIG. 2 in a next embodiment.

In a next exemplary embodiment, the economizer 12 is connected, downstream of the branch connection of the heating-water line 28, via an additional water line 43 to a high-pressure feedwater pump 44 arranged outside the waste-heat steam generator 2 (FIG. 4). The high-pressure feedwater pump 44 draws the preheated feedwater out of the economizer 12 downstream of the diverting of the heating water required for the external consumer 30 and delivers it again further downstream into a high-pressure economizer 45 arranged in the waste-heat steam generator 2. In addition, the feedwater pump 14 arranged in the feedwater feed line 13 of the waste-heat steam generator 2 is designed as a low-pressure feedwater pump. In this exemplary embodiment, only the low-pressure water delivered by the low-pressure feedwater pump 14 is admitted to the economizer 12 and the adjoining heating-water line 28. Only the quantity of feedwater used to generate steam for the condensing steam turbine 1 is directed through the high-pressure feedwater pump 44 and the high-pressure economizer 45. In this way, only a portion of the total water quantity has to be acted upon by high pressure. Therefore the auxiliary energy required for driving the two pumps 14, 44 can be used in an optimum manner. In addition, pressure-decrease losses in the heating-water line 28 right up to the feedwater tank 3 are avoided.

Figure 5:
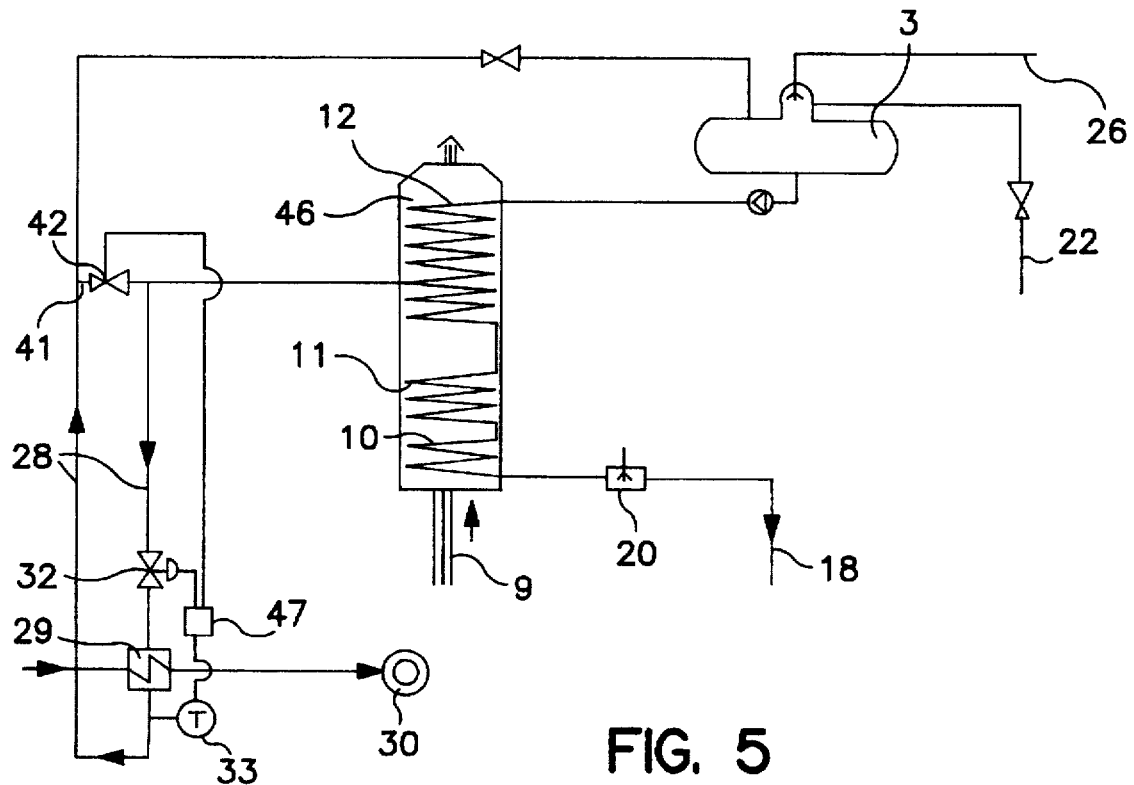
FIG. 5 shows a representation according to FIG. 3 in a further embodiment.

In a further exemplary embodiment, a waste-heat steam generator 46 designed as a mono-tube boiler is arranged between the gas-turbine group and the condensing steam turbine 1 (FIG. 5). This solution is considerably cheaper, since it does not need the steam drum 16, the circulating pump 19, the piping connecting them, and the corresponding control elements. Otherwise, this solution is of analogous design to the exemplary embodiment 3. If there is a low demand for heat at the external consumer 30, the released quantity of additional feedwater remains in the waste-heat steam generator 46 and is directly utilized there to generate steam for the condensing steam turbine 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of operating a combined gas-turbine group and a downstream water/steam cycle apparatus having at least a waste-heat steam generator and a steam consumer for heat/power cogeneration, the gas-turbine group including at least one compressor, a gas turbine, a combustion chamber and a generator, and the waste-heat steam generator being connected to a feedwater tank having a feedwater preheater/deaerator, the method comprising the steps of:
   a) directing feedwater for the water/steam cycle apparatus and additional heating water for an external heat consumer to a low temperature region of the waste-heat steam generator, and
   b) supplying heated feedwater and heating water to both the external heat consumer and to the water/steam cycle apparatus, wherein, the method further comprises the steps of:
   c) supplying the additional heating water to the waste-heat steam generator in a quantity sufficient for a maximum heating-water quantity required for the external heat consumer,
   d) determining a current demand for heating water for the external heat consumer,
   e) responsive to the determination of current demand, diverting the additional heating water as heated heating water from the water/steam cycle apparatus if there is a high to maximum demand for heating water, and retaining the additional heating water in the water/steam cycle apparatus if there is a low demand or no demand for heating water, the retained heating water being used for generating additional steam, and
   f) if the additional heating water is diverted, supplying the diverted heated heating water to the external consumer and thereafter, directing the diverted heating water to the feedwater tank to recover residual heat from the diverted heating water.

2. The method as claimed in claim 1, wherein the step of diverting the heated heating water to the external heat consumer includes bringing the diverted heated heating water into heat exchange with a heat transfer medium of the external heat consumer and then directing the diverted heated heating water to the feedwater tank.

3. The method as claimed in claim 2, wherein the step of determining the demand for heating water for the external heat consumer includes the steps of measuring a temperature of the diverted heating water after heat exchange with the heat transfer medium of the external heat consumer, determining a temperature difference between a current measurement and a previous measurement, and responsive to the determined temperature difference, controlling a quantity of the heating-water diverted from the water/steam cycle apparatus.

4. The method as claimed in claim 1, wherein the step of diverting the additional heating water includes diverting a demand quantity of the additional heating water corresponding to the current demand for heating water for the external consumer from the water/steam cycle apparatus, the method further comprising the steps of further heating a residual quantity of the additional heating water in the waste-heat steam generator, diverting the further-heated residual quantity of heating water from the water/steam cycle apparatus and dividing the further-heated residual quantity of heating water into two portions, a first portion being returned to the steam generator to generate steam and a second portion being recirculated to the feedwater tank.

5. The method as claimed in claim 1, further comprising the step of dividing the diverted additional heating water into a first portion for the external heat consumer and an excess second portion wherein the first portion is supplied to the external heat consumer and the second portion is fed directly to the feed/water tank.

6. The method as claimed in claim 5, wherein the step of directing the feedwater and additional heating water to the low temperature region of the waste-heat steam generator includes directing the feedwater and additional heating water at low pressure into the waste-heat steam generator, and further comprising the steps of guiding the heated feedwater out of the waste-heat steam generator after the step of diverting of the additional heating water for the external heat consumer, pumping the heated feedwater into the waste-heat steam generator at high pressure and further heating the feedwater before an evaporation step.

7. The method as claimed in claim 1, wherein the steam consumer is a steam turbine connected to drive an electrical generator, and further comprising the steps of generating steam from the feedwater, and feeding the steam to the steam turbine to generate electricity.

* * * * *